Sept. 15, 1925.　　　J. H. ASHBAUGH　　　1,554,175
REGULATOR SYSTEM
Filed March 15, 1922
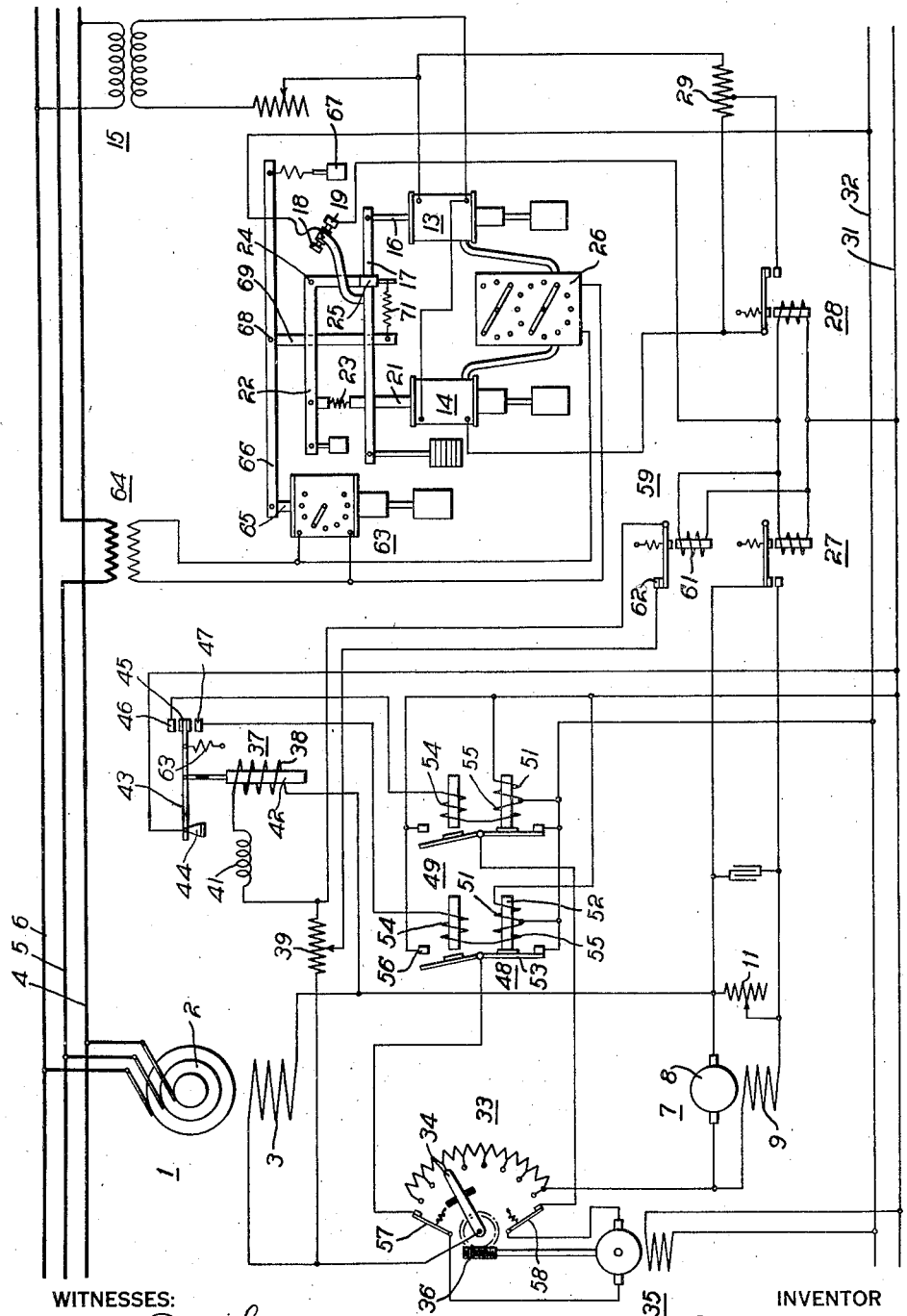
WITNESSES:
INVENTOR
John H. Ashbaugh.
BY
ATTORNEY Patented Sept. 15, 1925.

1,554,175

UNITED STATES PATENT OFFICE.

JOHN H. ASHBAUGH, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed March 15, 1922. Serial No. 543,834.

*To all whom it may concern:*

Be it known that I, JOHN H. ASHBAUGH, a citizen of the United States, and a resident of Wilkinsburg, in the county of Allegheny and State of Pennsylvania, have invented a new and useful Improvement in Regulator Systems, of which the following is a specification.

My invention relates to electric regulator systems and it has special relation to systems that are adapted to maintain substantially constant power-circuit conditions.

One object of my invention is to provide a regulator system that shall be quickly responsive to correct for changes of operating conditions of the power circuit over a wide range of voltages with maximum efficiency.

Another object of my invention is to provide a regulator system of the above-indicated character that shall embody means for automatically regulating the co-ordinate elements of the system within the limits of stable operation thereof and then automatically introduce other means for enabling the automatic regulating means to perform its normal function while producing an effect upon the system the equivalent to operating beyond the limits of stable operation of the elements thereof.

A further object of my invention is to provide a regulator system of the above-indicated character that shall compensate for the load conditions of the power system being regulated.

In brief, the system illustrated herein comprises a synchronous condenser that is connected to a transmission line, the field-magnet winding thereof being excited by means of an auxiliary generator and a regulator of the Tirrill type for controlling the voltage of the exciter in accordance with variations in voltage upon the transmission line. Normally, a Tirrill regulator has the relays thereof connected across the armature of the exciter. When so connected, the Tirrill regulator can control the exciter over a range of exciter voltages of two to one or, at most, three to one. That is to say, assuming a 250-volt exciter, the Tirrill regulator will provide regulated operation between 85 volts and 250 volts. This range of stable regulation is limited by the inherent characteristics of the relays.

However, in the present application, the Tirrill regulator is designed as what may be termed "a broad range" regulator. That is to say, the relays are energized from an independent source, such as a storage battery, so that reductions in the exciter voltage do not affect the operation of the relays.

Accordingly, the limit of stable regulation becomes solely the inherent characteristics of the exciter, which means that stable regulation and stable operation become synonymous. Stable operation occurs substantially between the residual voltage and the maximum voltage of the exciter. In 250-volt exciters, this is substantially between the limits of 25 to 40 volts as the lower limit, and 250 volts as the higher limit.

In the operation of synchronous condensers, it has been found that, if the excitation of the field winding of the condenser can be lowered below the residual voltage of the exciter, a smaller condenser may be designed which will have the same effect upon the transmission line as synchronous condensers of the heretofore standard size. To accomplish this end, it has been proposed to insert a motor-operated rheostat in circuit between the exciter and the condenser field-magnet winding and to control this rheostat by an electromagnet connected across the terminals of the exciter. In this way, when it is desired to excite the field winding of the condenser below the residual voltage of the exciter, the rheostat is cut in to reduce the voltage applied to the condenser field-magnet winding. The exciter may then build up above its residual magnetism and continue in operation while the net effect upon the condenser and the power system is equivalent to using excitation voltages below the residual voltage of the exciter. That is to say, when the normal regulation has reached the limit of its effectiveness, then the rheostat is cut in. This raises the voltage of the exciter within the range of good regulation but does not disturb the voltage of the condenser field.

The present invention utilizes the described elements but does not insert the rheostat in the excitation circuit until the voltage upon the condenser field-magnet winding has been reduced to substantially that corresponding to the residual voltage of the exciter. Also, according to the present invention, only so much of the rheostat as may be required for the particular variation to be corrected for is inserted.

The present invention further contemplates placing, in cooperative relation with the Tirrill regulator, electromagnetic means for giving the voltage regulator a drooping characteristic proportional to the current that the condenser takes from the line. When there is full current on the condenser, this magnetic means supersedes the action of the voltage regulator and controls the main contact members thereof to maintain a constant current upon the transmission line in order to prevent overloading of the condenser.

Referring to the accompanying drawing, the single figure is a diagrammatic illustration of the circuits and apparatus embodying my invention.

A synchronous condenser 1, having an armature 2 and a field-magnet winding 3, is connected to a transmission line comprising conductors 4, 5 and 6. The field-magnet winding 3 is energized by an exciter generator 7, comprising an armature 8 and a field-magnet winding 9. In circuit with the field-magnet winding 9 is an adjustable resistor 11.

The excitation of the condenser field-magnet winding is controlled by means of a Tirrill regulator 12, comprising a control electromagnet 13 and an anti-hunting electromagnet 14 that are energized from transformer 15 which is connected across the transmission line. The electromagnet 13 has a core armature 16 which is pivotally connected to a lever 17. The lever 17 carries a contact member 18 which is adapted to cooperate with the normally stationary contact member 19. The vibrating electromagnet 14 has a core armature 21, which is connected to a bell-crank lever 22 through a spring 23. The lever 22 is pivoted at 24 and is fastened to the lever 17, as indicated at 25. Compensating rheostats 26 are connected in circuit with the magnets 13 and 14 for well-known purposes.

The main contact members 18 and 19 control the circuit for the relays 27 and 28. The relay 27 controls a shunt circuit for the resistor 11, which is connected in circuit with the field-magnet winding 9 of the exciter. The relay 28 controls a shunt circuit for a resistor 29, which is connected in circuit with the vibrating electromagnet 14. The relays 27 and 28 are adapted to be energized from control bus bars 31 and 32, which may be connected to any independent source of supply, such as a battery.

The functioning of the Tirrill regulator is so well known that it is not deemed necessary to describe it in detail here.

By having relays 27 and 28 energized from an independent source, they are not subject to the fluctuations in the exciter voltage. Accordingly, the regulator mechanism 12 will function over the entire range of stable operation of the exciter 7, which is substantially from the residual voltage to the maximum voltage for which the exciter is designed.

It sometimes becomes desirable to impress upon the condenser field-magnet winding a voltage below the residual voltage of the exciter. Therefore, a rheostat 33, the arm 34 of which is adapted to be controlled by a motor 35 through gearing 36, is inserted in the armature circuit of the exciter 7.

The operation of the rheostat motor is controlled by reversing switches 48 and 49. Switches 48 and 49 are counterparts and, therefore, switch 48 alone will be described. It comprises a coil 51, which is permanently energized from the control bus bars 31 and 32. Coil 51 is mounted upon a core 52, and, when energized, pulls the arm 53 into the position indicated in the drawing. When contact member 45 is moved into engagement with contact member 47, an energizing circuit is completed for an operating coil 54 and a neutralizing coil 55. The coil 54 will cause the attraction of the arm 53 against the contact member 56, as the coil 55 neutralizes the magnetic flux of the coil 51. Motor 35 will then be energized in one direction. Upon the closure of switch 49, motor 35 will be operated in the opposite direction. The armature circuit of motor 35 extends through limit switches 57 and 58 for a well-known purpose.

Switches 48 and 49 are selectively controlled by an electromagnet 37, the coil 38 of which is connected across the terminals of the exciter armature 8 through a variable resistor 39 and a reactor 41. The core 42 of the electromagnet 37 is pivotally connected to arm 43 that is pivoted at 44 and carries contact member 45. The contact member 45 engages the one or the other of contact members 46 and 47, which are respectively connected in circuit with the operating coils 54 and 55 of reversing switches 48 and 49.

The switch 37 would function to insert the resistor 33 prior to the reaching of the residual voltage of the exciter if the value of the resistor 39 was left unchanged. Furthermore, if the value of the resistor 39 is properly controlled, the switch 37 may have an intermittent operation, thereby inserting the resistor 33 in a step-by-step manner, as required.

Accordingly, the present invention provides an electromagnet 59, the coil 61 of which is connected in parallel relation to the relays 27 and 28 of the Tirrill regulator and the contact members 62 of which are normally closed, thus completing the shunt circuit for the resistor 39. As the relays 27 and 28 are caused to vibrate under the action of the control elements of the Tirrill regulator, the electromagnet 59 will also be caused to vibrate in its control of the resistor 39. Thus, the resistor 39 is given a mean value in the circuit of the coil 38 that is proportional to the variations in the operation of the Tirrill regulator.

The electromagnet 37 normally pulls against the spring 63. When the two exactly balance, the contact member 45 assumes the neutral position between contact members 46 and 47, as illustrated. In securing the step-by-step control of the rheostat, the necessary balance of pull is again obtained by variations in the value of the resistor 39 that are caused by the reaction of the corrective movement that is applied to the operation of the Tirrill regulator.

To prevent overloading of the condenser, a magnet 63, that is energized from the series transformer 64, is placed in cooperative relation with the Tirrill regulator 12. The electromagnet 63 has a core armature 65 pivotally connected to a lever arm 66 and having a counterweight 67 at the free end thereof. The lever arm 66 is pivoted at 68 and has fastened thereto a depending arm 69. Arm 69 is connected to the lever system of the Tirrill regulator by means of a spring 71. The normal action of the electromagnet 63 is to give a drooping characteristic to the regulation curve in accordance with the increase in the wattless component of the transmission line. When the condenser 1 is drawing maximum lagging current, it is desirable to prevent overloading thereof.

The regulator controls the excitation of the synchronous condenser in accordance with the voltage of the power circuit. Inasmuch as changes in voltage drop on the line has a definite relation to the changes in power factor of the line, the control of the excitation of the synchronous condenser varies the amount of wattless leading or lagging current that is drawn from the line, and this wattless current is controlled so as to be opposite to the wattless line current. That is, if the wattless component of the line current is inductive, the wattless current taken by the condenser will be condensive.

The voltage regulator will normally attempt to make a complete correction for the power-factor condition of the line, depending upon the setting of the regulator chosen, which will vary for different desired power factors.

If, however, the current of the line becomes lagging to a considerable degree, that is, the wattless component of the line current becomes large, due to a high inductive reactance in the line, the regulator will cause the synchronous condenser to take a correspondingly high value of leading current, that is, it introduces a relatively high wattless component of current into the line by increasing the condensive reactance thereof. As the condensive reactance of the line is increased and the lagging current taken by the synchronous condenser is increased in attempting to maintain a normal power factor on the line, a point is reached beyond which it is unsafe to further load the synchronous condenser. As this point is approached, the magnet 63 operates to vary the tension on the spring 71, thus varying the pull of the control magnet 13 necessary to balance the spring tension and, consequently, the voltage applied to the magnet 13 that will cause a separation of the main regulator contacts.

In this manner, the setting of the regulator is varied so that it will compensate for lagging current up to the capacity of the synchronous condenser and that, as any further increase in wattless current occurs, the setting of the regulator will prevent a further degree of regulation. The magnet 63, therefore, operates to give the regulator a drooping characteristic with increase of load on the synchronous condenser, that is, it operates as a load-limiting magnet.

When it is desired to under-excite the synchronous condenser so that it will draw current from the line that lags considerably behind the electromotive force, a condition arises requiring a voltage to be impressed upon the condenser field winding below the residual voltage of the exciter.

The herein-described regulator system comprises a regulator adapted to maintain normal operation of the synchronous condenser within the range of exciter voltage extending from substantially the residual voltage thereof to its maximum voltage. When it is desired to under-excite the condenser, element 37 is operated to insert so much of the rheostat 33 as may be required for the particular line variation. As the rheostat 33 is completely cut in step-by-step, it will likewise be completely cut out step-by-step. If the variation to be corrected for is large, the rheostat may be completely cut in or cut out, in which case the limit switches 57 and 58 will halt the operation of the rheostat motor.

In the control of the rheostat motor 35, it will be noted that, in the normal position of the reversing switches 48 and 49, the armature circuit of the rheostat 35 is closed upon itself, thus effecting a quick stopping of the motor whenever the switches are so operated. It will furthermore be noted that the armature circuit extends through the limit switches 57 and 58 so that, as the rheostat arm 34 approaches the end of the row of the rheostat contact members, the armature circuit will be interrupted to prevent useless operation of the motor.

Modifications in the system and arrangement and location of parts may be made within the spirit and scope of my invention, and such modifications are intended to be covered by the appended claims.

I claim as my invention:—

1. In a regulator system, the combination with a transmission line, a synchronous condenser connected thereto, an exciter therefor, means operated in accordance with the voltage of the line to govern the excitation of said exciter between substantially the residual voltage and the maximum voltage thereof, said means comprising a main control electromagnet, an anti-hunting electromagnet, a pair of contact members controlled thereby and a plurality of relays governed in accordance with the operation of said contact members, said relays being energized from an independent source, and electromagnetic means responsive to the current of the line and co-operating with said regulating means to modify the action thereof and, at predetermined times, to supersede the action thereof, of means for impressing upon said condenser field-magnet winding voltages below the residual voltage of the exciter, said means comprising a rheostat located in the excitation circuit of said condenser field-magnet winding, a motor for operating said rheostat, a plurality of switches adapted to control the direction of rotation of said motor, electromagnetic means connected across said exciter and adapted to selectively control said switches, and means connected in parallel with said relays and adapted to vary the value of the operating current of said last-mentioned electromagnetic means.

2. In a regulator system, the combination with a power circuit, a dynamo-electric machine connected thereto and having a field-magnet winding, an exciter therefor, means operated in accordance with the voltage of the line to govern the operation of said exciter between the limits of substantially the residual voltage and the maximum voltage thereof, said means comprising a main control element, anti-hunting means, and a plurality of relays governed thereby, said relays being energized from an independent source, and electromagnetic means responsive to the current of the line and co-operating with said regulating means to modify the action thereof and, at predetermined times, to supersede the action thereof, of means for impressing upon said machine field-magnet winding voltages below the residual voltage of the exciter, said means comprising a current-consuming device located in the excitation circuit of said machine field-magnet winding, electromagnetic means connected across said machine field-magnet winding and adapted to vary the value of said device and means connected in parallel with said relays and adapted to vary the value of the operating current of said last-mentioned electromagnetic means.

3. In a regulator system, the combination with a power circuit, a dynamo-electric machine connected thereto and having a field-magnet winding, an exciter therefor, means operated in accordance with the voltage of the line to control the operation of said exciter between the limits of substantially the residual voltage and the maximum voltage thereof, and means responsive to the current of the line and co-operating with said voltage-regulating means, of additional means for impressing upon said machine field-magnet winding voltages below the residual voltage of the exciter, said means comprising a current-consuming device co-operating with said exciter, electromagnetic means connected across said exciter and adapted to vary the operation of said device and controlled by means in circuit with said voltage regulator.

4. In a regulator system, the combination with a power circuit, a dynamo-electric machine connected thereto and having a field-magnet winding, an exciter therefor, means operated in accordance with the voltage of the line to control the operation of said exciter from substantially the residual voltage thereof, anti-hunting means co-operating therewith, and means operated in accordance with the conditions of load of said machine and co-operating with said regulator, of means for impressing upon said machine field-magnet winding voltages below the residual voltage of the exciter, said means comprising a current-consuming device co-operating with said exciter and controlled in accordance with an operating condition of said machine.

5. In a regulator system, the combination with a power circuit, a dynamo-electric machine connected thereto and having a field-magnet winding, an exciter therefor, and means operated in accordance with the voltage of the line to control the operation of said exciter from substantially the residual voltage thereof, of means for impressing upon said machine field-magnet winding voltages below the residual voltage of the exciter, said means comprising a current-consuming device associated with said field-magnet winding and controlled in accordance with the energization thereof, and means in circuit with said voltage-regulating means and adapted to co-operate in the control of said device.

6. In a regulator system, the combination of a dynamo-electric machine and a vibratory regulator therefor comprising a control electromagnet, a second electromagnet energized from the same source having a core armature, a bell-crank lever to which said core armature is secured, a lever arm carried by said bell-crank lever and connected to said control electromagnet, a contact member mounted upon said lever arm, and a normally stationary cooperating contact member, a third electromagnet, energized in accordance with the current of said source, and biasing means connecting said third electromagnet to said bell-crank lever.

7. In a regulator system, the combination of a dynamo-electric machine and a vibratory regulator associated therewith comprising a plurality of electromagnets, a lever system controlled thereby, contact members operated by said lever system, means for energizing one of said electromagnets in accordance with the flow of wattless current in the system, said electromagnet being operative to vary the setting of the regulator to limit the loading of said dynamo-electric machine.

8. In an electrical system, the combination with a dynamo-electric machine, and vibratory regulator means operatively associated therewith comprising a control electromagnet, an anti-hunting electromagnet, a lever system controlled thereby, contact members actuated by said lever system, and a plurality of relays controlled by said contact members, of electroresponsive means energized in accordance with the current of said system, a lever arm operated thereby, a second lever arm secured thereto, and a spring connection between said second lever arm and said lever system whereby said electroresponsive means is adapted to modify the operation of said regulator in accordance with the current conditions of said system and, at predetermined times, to supersede the action of said regulator means in order to maintain constant current upon said system, and means whereby said regulator will function to insure stable operation of said system beyond the normal range of said regulator.

9. In an electrical system, the combination with a dynamo-electric machine, and regulator means operatively associated therewith comprising a plurality of electromagnets and a lever system, and a plurality of relays controlled thereby, of electroresponsive means energized in accordance with the current of said system, a lever arm operated thereby, and a spring connection between said lever arm and said lever system whereby said electroresponsive means will modify the operation of said regulator in accordance with the current conditions of said system, and means whereby said regulator will function to insure stable operation of said system beyond the normal range of said regulator.

10. In an electrical system, the combination with a dynamo-electric machine, voltage-regulator means operatively associated therewith, and means co-operating with said regulator for modifying the operation thereof in accordance with the current of said system and, at predetermined times, to supersede the action of said regulator means to maintain constant current upon said system, of additional means whereby said regulator will function to insure stable operation of said system beyond the normal range of said regulator.

11. In an electrical system, the combination with a dynamo-electric machine, an exciter therefor, regulator means co-operating therewith and normally regulating within the limits of substantially the residual voltage and the maximum voltage of the exciter, and means adapted to modify the operation of said regulator in accordance with the load of said dynamo-electric machine, of means whereby said regulator will function to insure stable operation of said system beyond the normal range of said regulator.

12. In a regulator system, the combination with a power circuit, a dynamo-electric machine connected thereto, an exciter therefor, and regulator means adapted to control the excitation of said dynamo-electric machine to maintain substantially constant power-circuit conditions and having a normal operating range corresponding to the stable operating range of said exciter, of means for extending the effective range of operation of said regulator comprising means for varying the value of the excitation of said machine, and means for modifying the operation of said regulator in accordance with variations in the load conditions of said dynamo-electric machine.

13. In a regulator system, the combination with a power circuit, a dynamo-electric machine connected thereto, an exciter therefor, and regulator means adapted to control the excitation of said dynamo-electric machine and having a normal operating range corresponding to the stable operating range of said exciter, of means for extending the effective range of operation of said regulator, and means for varying the setting of said regulator to limit the load on said dynamo-electric machine.

14. In a regulator system, the combination with a power circuit, a dynamo-electric machine connected thereto and an exciter therefor, of means for controlling the operation of said dynamo-electric machine comprising a regulator and resistors respectively in circuit with said machine and said exciter, said regulator normally controlling one of said resistors and at predetermined times controlling another of said resistors to increase the limit of stable regulation of said machine.

15. In a regulator system, the combination with a power circuit, a dynamo-electric machine connected thereto and an exciter therefor, of means for controlling the operation of said dynamo-electric machine comprising regulator means and resistors respectively in circuit with said machine and said exciter, said regulator means normally controlling one of said resistors and at predetermined times controlling another of said resistors to increase the limit of stable regulation, and means adapted to modify the action of said regulator means in accordance with the load conditions of said system.

16. In a regulator system, the combination with a power circuit, a dynamo-electric machine connected thereto and having a field-magnet winding, an exciter therefor, and regulator means adapted to control the operation of said exciter to cause said machine to maintain substantially constant power-circuit conditions, of additional means for varying the value of the excitation current of said dynamo-electric machine whereby said regulator will function to control said dynamo-electric machine over a wider range than the normal range thereof, and comprising means adapted to effect a step-by-step operation of said additional means.

17. In a regulator system, the combination with a power circuit, a dynamo-electric machine connected thereto, and an exciter therefor, of regulator means adapted to control the excitation of said machine to maintain substantially constant power-circuit conditions and comprising means for varying the value of the excitation of said dynamo-electric machine whereby said dynamo-electric machine will receive stable regulation beyond the normal range of stable regulation, and additional means adapted to effect an intermittent operation of said excitation-varying means.

18. In a regulator system, the combination with a power circuit, a dynamo-electric machine connected thereto having a field-magnet winding, an exciter therefor, and regulating means whereby said exciter may impress upon said field-magnet winding voltages between the limits of its residual voltage and its maximum voltage, of means co-operating with said regulating means for producing an effect upon said power circuit equivalent to under-exciting the field-magnet winding of said exciter, thereby enabling said regulator to control said dynamo-electric machine over the entire range, and means operated in accordance with power-circuit conditions for modifying the action of said regulating means to limit the current on said dynamo-electric machine.

In testimony whereof, I have hereunto subscribed my name this 10th day of March, 1922.

JOHN H. ASHBAUGH.